(12) United States Patent
Isenhour et al.

(10) Patent No.: US 9,778,427 B2
(45) Date of Patent: Oct. 3, 2017

(54) CABLE ASSEMBLY WITH CABLE ATTACH STRUCTURE HAVING OFF-AXIS FIBER ROUTING

(71) Applicant: CORNING OPTICAL COMMUNICATIONS LLC, Hickory, NC (US)

(72) Inventors: Micah Colen Isenhour, Lincolnton, NC (US); Dennis Michael Knecht, Hickory, NC (US); Xin Liu, Hickory, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 86 days.

(21) Appl. No.: 14/269,363

(22) Filed: May 5, 2014

(65) Prior Publication Data

US 2014/0241674 A1    Aug. 28, 2014

Related U.S. Application Data

(63) Continuation of application No. PCT/US2012/064265, filed on Nov. 9, 2012.
(Continued)

(51) Int. Cl.
*G02B 6/42* (2006.01)
*G02B 6/38* (2006.01)

(52) U.S. Cl.
CPC .......... *G02B 6/423* (2013.01); *G02B 6/3887* (2013.01); *G02B 6/428* (2013.01); *G02B 6/4284* (2013.01); *Y10T 29/49124* (2015.01)

(58) Field of Classification Search
None
See application file for complete search history.

(56) References Cited

U.S. PATENT DOCUMENTS

| | | | |
|---|---|---|---|
| 4,422,715 A | 12/1983 | Williams et al. | 350/96.2 |
| 4,496,213 A | 1/1985 | Borsuk | |

(Continued)

FOREIGN PATENT DOCUMENTS

| | | |
|---|---|---|
| CN | 101561537 | 11/2011 |
| CN | 101636679 | 4/2012 |

(Continued)

OTHER PUBLICATIONS

International Search Report and Written Opinion issued in corresponding PCT Application No. PCT/US2012/064265, mailed May 10, 2013.
(Continued)

*Primary Examiner* — Uyen Chau N Le
*Assistant Examiner* — Chad Smith
(74) *Attorney, Agent, or Firm* — Michael E. Carroll, Jr.

(57) ABSTRACT

A cable attach structure for attaching a fiber-optic cable to a rear end and a connector to a front end is disclosed. In one embodiment, the cable attach structure is a portion of a fiber optic cable assembly having a fiber optic cable with at least one optical fiber and a connector attached to the optical fiber. The fiber optic cable is attached to the cable attach structure at a rear end and circuit board is attached to the cable attach structure at the front end. The cable attach structure also routes the at least one optical fiber away from the centerline of the connector for off-axis fiber routing. In other embodiments, the optical fiber can enter the connector from a first direction and attach to the connector in a second direction if desired.

20 Claims, 17 Drawing Sheets

Related U.S. Application Data

(60) Provisional application No. 61/557,648, filed on Nov. 9, 2011.

(56) References Cited

U.S. PATENT DOCUMENTS

| | | | | |
|---|---|---|---|---|
| 4,678,264 | A * | 7/1987 | Bowen | G02B 6/3817 385/88 |
| 4,902,092 | A | 2/1990 | Grandy | 350/96.2 |
| 5,066,097 | A | 11/1991 | Brandle et al. | 385/76 |
| 8,382,385 | B2 * | 2/2013 | McColloch | H05K 9/0058 385/88 |
| 2007/0237468 | A1 | 10/2007 | Aronson et al. | 385/100 |
| 2007/0237472 | A1 * | 10/2007 | Aronson | G02B 6/4292 385/101 |
| 2009/0116793 | A1 | 5/2009 | Nishimura et al. | |
| 2010/0124395 | A1 | 5/2010 | Lin et al. | |
| 2010/0124845 | A1 | 5/2010 | Sabo et al. | 439/607.01 |
| 2010/0135618 | A1 | 6/2010 | Howard et al. | |
| 2010/0158448 | A1 * | 6/2010 | Yi | G02B 6/3817 385/74 |
| 2010/0209067 | A1 | 8/2010 | Beck | |
| 2010/0215325 | A1 | 8/2010 | Tamura et al. | |
| 2011/0081119 | A1 | 4/2011 | Togami et al. | 385/89 |
| 2011/0229083 | A1 | 9/2011 | Dainese Junior et al. | |
| 2011/0304996 | A1 * | 12/2011 | Wu | G02B 6/4261 361/752 |

FOREIGN PATENT DOCUMENTS

| | | | | |
|---|---|---|---|---|
| EP | 0131283 | | 1/1985 | |
| GB | 2239104 | A | 6/1991 | G02B 6/42 |
| KR | 20100000805 | * | 1/2010 | H01R 12/28 |
| WO | 03042740 | | 5/2003 | |
| WO | 2010099141 | | 9/2010 | |
| WO | 2011034544 | A1 | 3/2011 | |
| WO | 2013052565 | | 4/2013 | |

OTHER PUBLICATIONS

IPRP issued in corresponding PCT Application No. PCT/US2012/064265, mailed May 13, 2014.

* cited by examiner

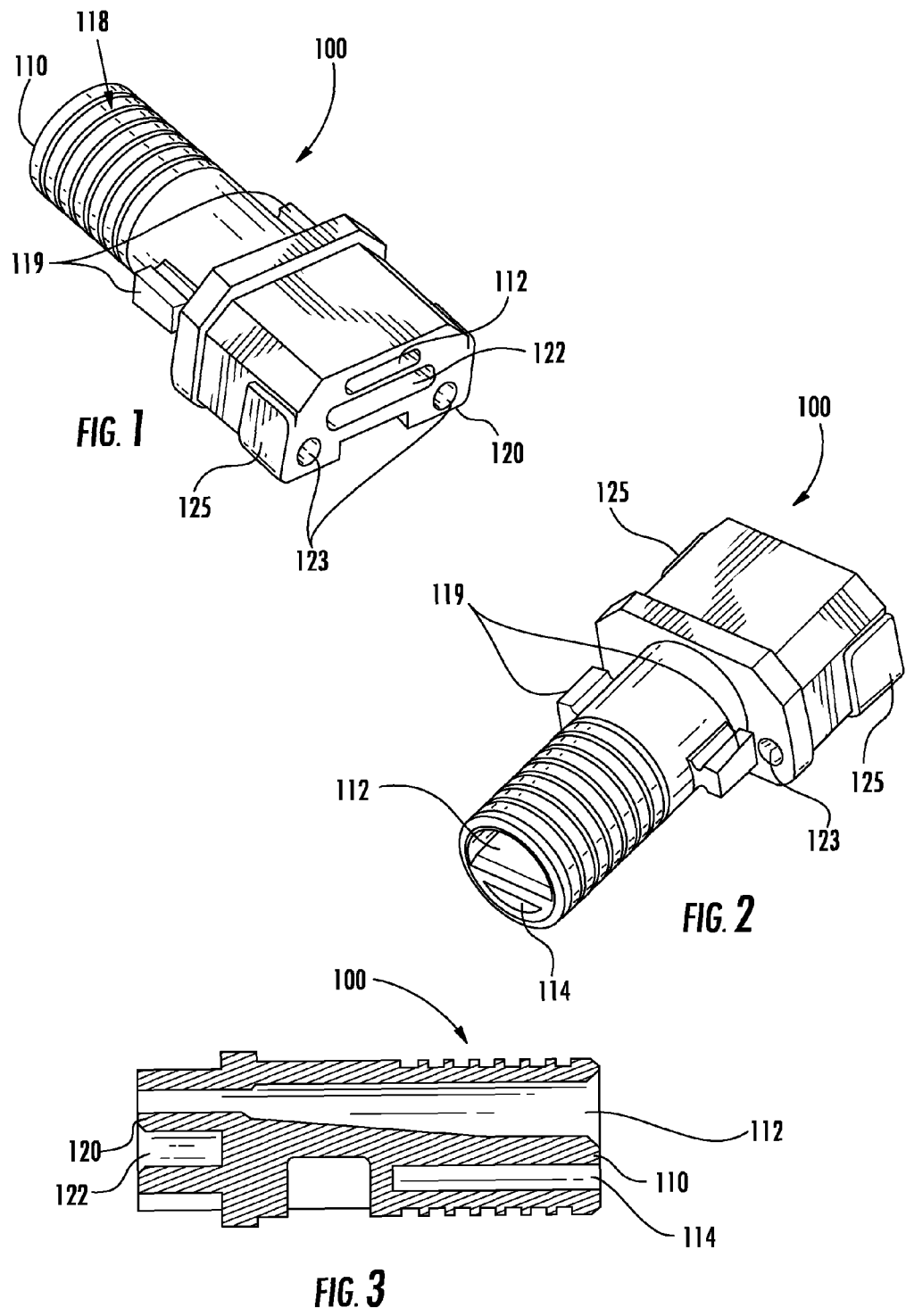

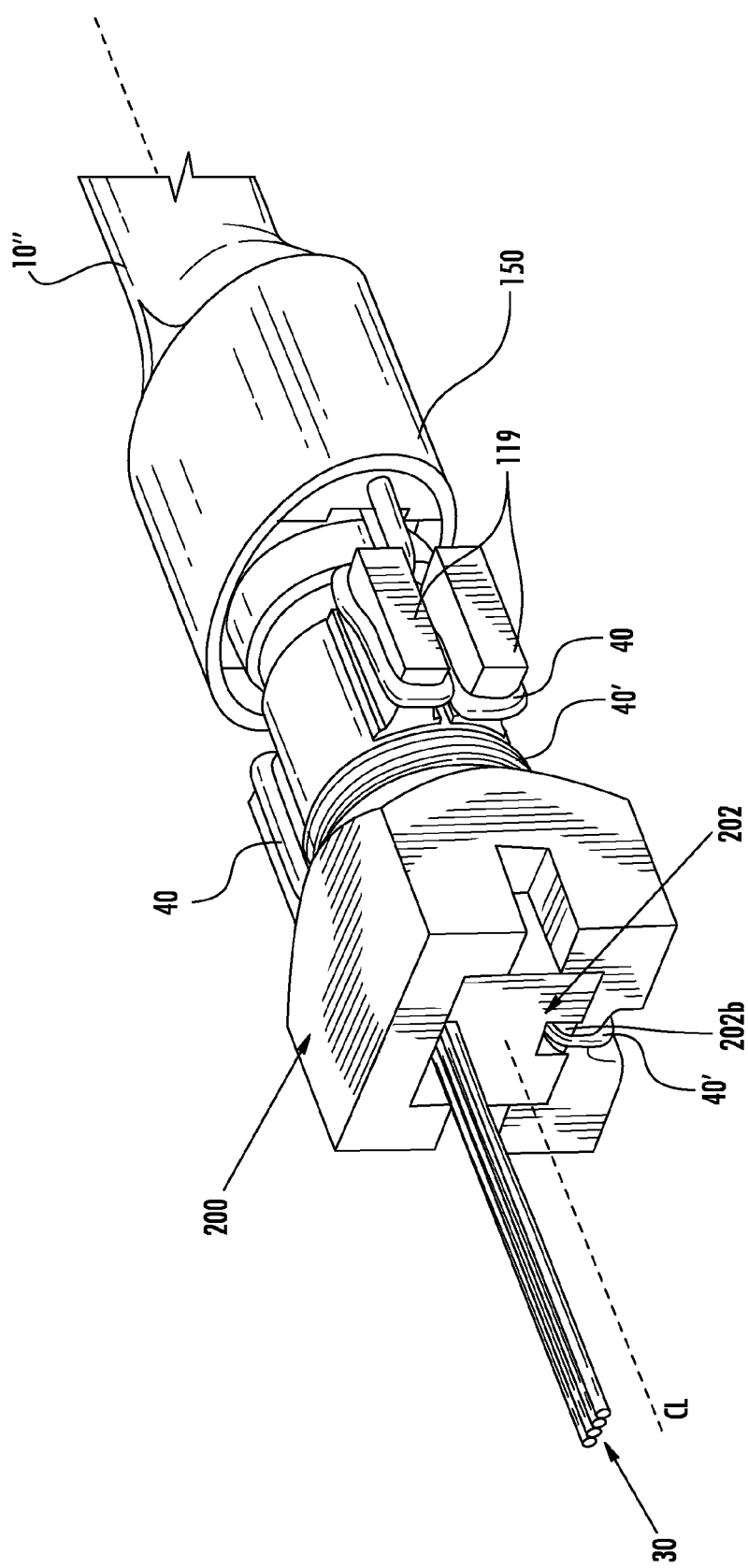

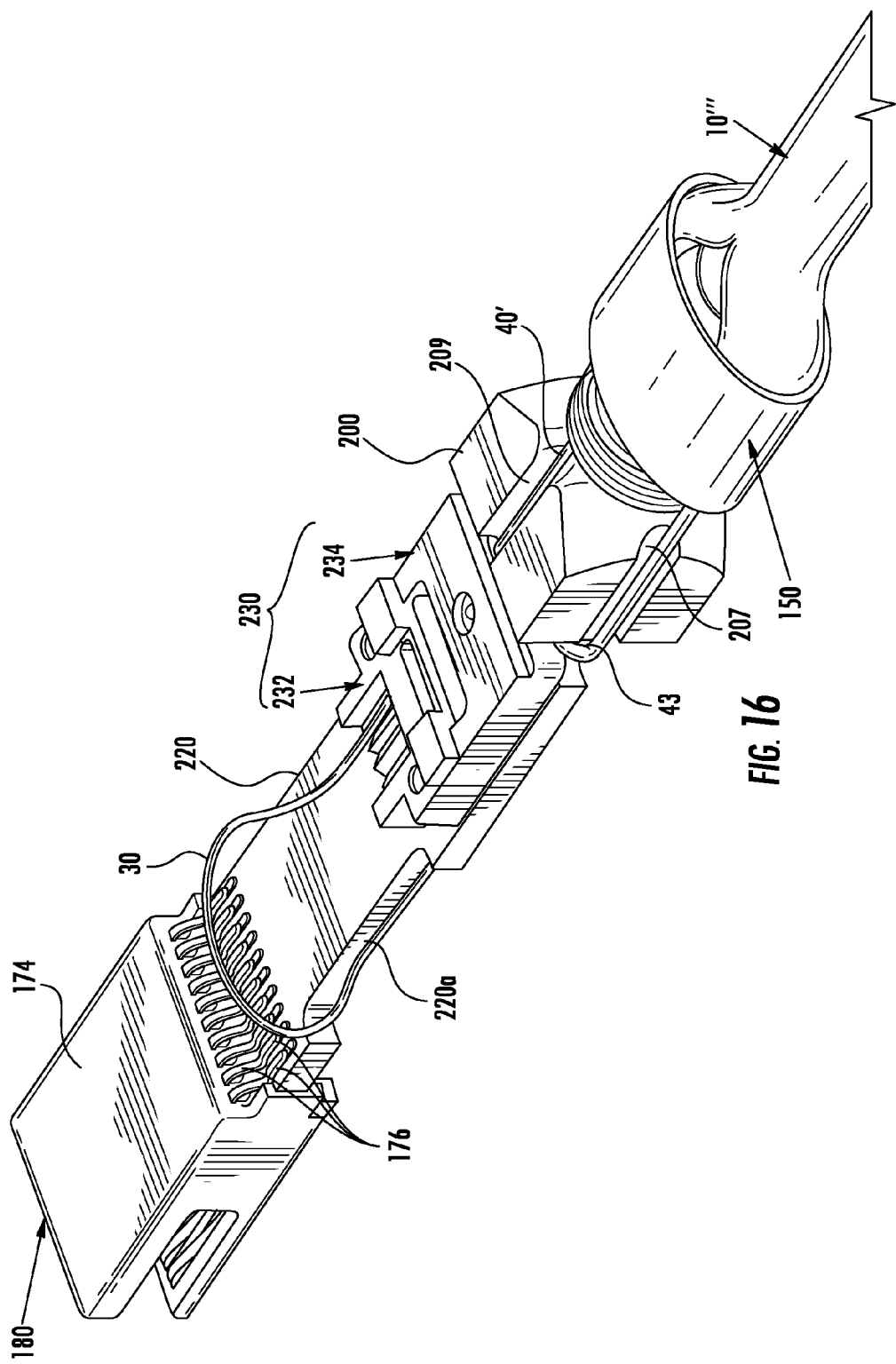

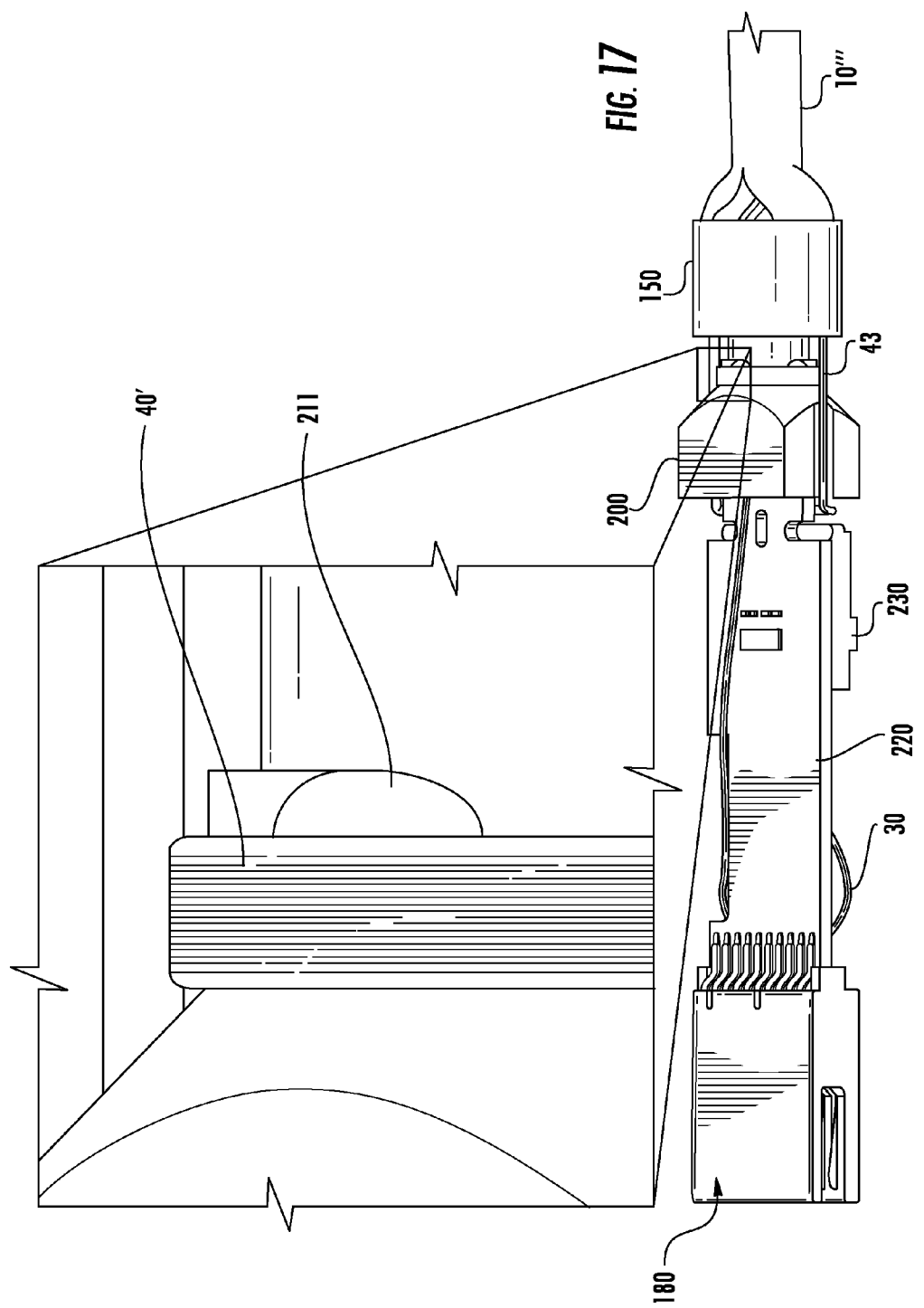

CABLE ASSEMBLY WITH CABLE ATTACH STRUCTURE HAVING OFF-AXIS FIBER ROUTING

RELATED APPLICATIONS

This application is a continuation of International Application No. PCT/US12/64265, filed Nov. 9, 2012, which claims the benefit of priority to U.S. Application No. 61/557,648, filed Nov. 9, 2011, both applications being incorporated herein by reference.

FIELD

The present disclosure relates to fiber-optic cables, and in particular relates to an attachment structure for a fiber-optic cable that allows the cable to be attached for connectorized, and further relates to attachment structures for fiber-optic-cable assemblies that support a substrate such as a circuit board at the front end.

BACKGROUND

Fiber-optic cables are known for their ability to transmit data at faster rates than electrical wires. With the increasing demand for high-speed data transmission for consumer electronic devices (smart phones, tablet computers, laptop computers, digital cameras, video cameras, etc.), fiber-optic cables are starting to replace electrical cables for data transmission applications.

To this end, the fiber-optic cables need to be terminated in a manner that allows for them to be operably connected to the electronic devices. For example, many consumer electronic devices have Universal Serial Bus (USB) electrical ports for establishing an electrical connection with an external device. The latest USB specification (USB 3.0) supports a data rate of 5 Gb/s, which is ten times faster than the previous USB specification (USB 2.0), and the latest version is still backwards compatible with the USB 2.0. As fiber optic cable designs begin migrate into this space to support faster data rates, they still must be backwards compatible with the installed base of ports. Active optical cable (AOC) assemblies allow the use of the optical fibers as the transmission medium between connectors instead of copper wires; however, the optical signals conveyed by the optical fibers are converted into electrical signals so that the connector has an electrical interface making compatible with installed base.

In other words, for an AOC fiber-optic cable to be connected to a USB port, it must be terminated with a USB electrical interface configured to transmit electrical signals at the port connection. Unlike a fiber-optic cable used for telecommunications that experiences relatively few connections and disconnections to a panel in a controlled environment, a fiber-optic cable used for consumer electronics will experience frequent connections and disconnections in a variety of environments. Consequently, the mechanical connection between the fiber-optic cable and the connector that terminates the cable must be robust for the large number of mating/unmating cycles required during its lifetime, while still providing a low-cost solution that is quick and easy to manufacture.

SUMMARY

An aspect of the disclosure is a cable attachment structure for securing a fiber optic cable to a rear end and a connector to a front end is disclosed. The cable attachment structure may also form a portion of a fiber optic cable assembly. By way of example, the fiber optic cable assembly may include a fiber optic cable having at least one optical fiber and a connector attached to the at least one optical fiber. The cable attach structure has the fiber optic cable attached thereto and routes the at least one optical fiber away from the centerline of the connector. Additionally, a circuit board of the fiber optic connector is secured to the cable attach structure.

In another embodiment, the cable attachment structure forms a portion of a fiber optic cable assembly having a fiber optic cable with at least one optical fiber and a connector attached to the at least one optical fiber with the optical fiber entering the connector from a first direction and attaching to the connector in a second direction. The cable attach structure has the fiber optic cable attached thereto and routes the at least one optical fiber away from the centerline of the connector. Additionally, a circuit board of the fiber optic connector is secured to a cable attach structure.

In another embodiment, the cable attachment structure may also form a portion of a fiber optic cable assembly where an insert is used with the cable attachment structure. By way of example, the fiber optic cable assembly may include a fiber optic cable having at least one optical fiber and a connector attached to the at least one optical fiber. The cable attach structure has the fiber optic cable attached thereto and receives an insert into a cavity of the cable attach structure. The cable attach structure routes the at least one optical fiber away from the centerline of the connector. Additionally, a circuit board of the connector may be secured to a cable attach structure.

The disclosure is also directed to the cable attach structure including a body having a front end and a rear end. The cable attach structure has a structure such as an integrally formed passageway for routing the at least one optical fiber away from the centerline of the cable attach structure. In further embodiments, an insert may be received in a cavity located at the front end of the body for aiding the off-axis routing of the optical fiber.

The disclosure is also directed to a method of making a fiber optic cable assembly including the steps of providing a fiber optic cable having at least one optical fiber and providing a cable attach structure having a passageway for routing the at least one optical fiber away from the centerline of the cable attach structure. The fiber optic cable is attached to a rear end of the cable attach structure. The method also includes providing a circuit board and securing the circuit board to a front end of the cable attach structure. The method may also include other steps such as disclosed and described herein.

Additional features and advantages are set forth in the description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework for understanding the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIGS. 1 and 2 respectively are front and rear perspective views of a first cable attach structure;

FIG. 3 is a cross-sectional view of the cable attach structure shown in FIGS. 1 and 2 showing a fiber pathway extending from a rear end to a front end;

FIGS. 9-11 are detailed views of another fiber optic cable assembly that has a cable attach structure that includes an insert for off-axis optical fiber routing;

FIGS. 16 and 17 respectively are top and bottom perspective views of the fiber optic cable assembly of FIG. 14 showing details of the design;

DETAILED DESCRIPTION

Figure 4A:
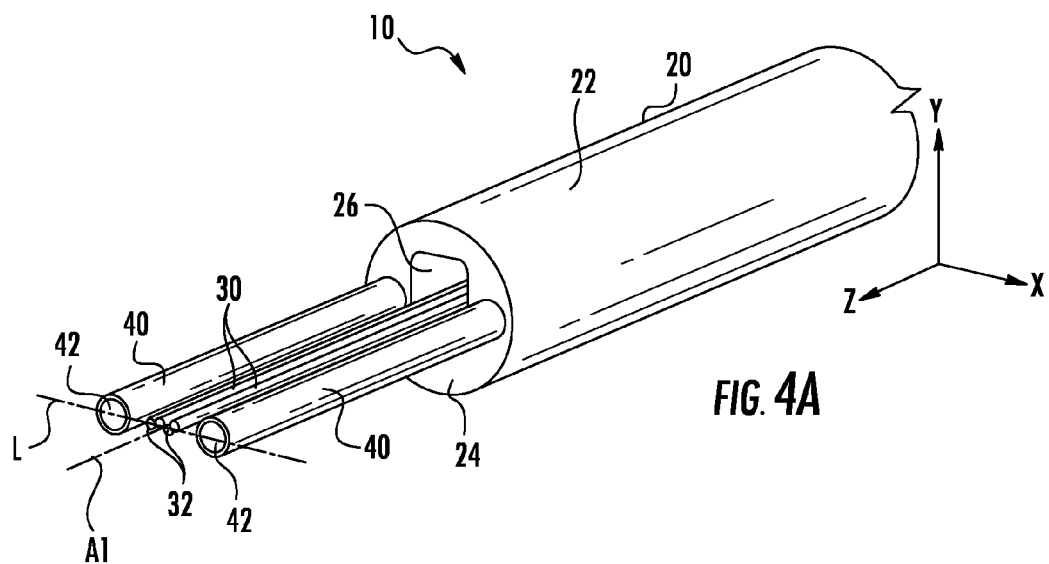
FIG. 4A is a perspective view of an example fiber optic cable that includes two peripheral strength members.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure. The claims as set forth below are incorporated into and constitute part of this Detailed Description. Cartesian coordinates are shown in some of the Figures for the sake of reference and are not intended to be limiting as to direction or orientation.

The present disclosure is directed to cable attach structures suitable for securing or attaching a fiber optic cable at a rear end and constructing a connector adjacent to a front end. FIGS. 1-3 depict a cable attach structure 100 having a body with a rear end 110 suitable for attaching a fiber optic cable having at least one optical fiber thereto and a front end 120 for constructing a connector adjacent thereto and having the at least one optical fiber attached to the connector as disclosed herein. In this embodiment, cable attach structure 100 is formed as monolithic (i.e., one-piece) structure; however, other cable attach structures may have a multiple piece construction. As best shown in FIG. 3, cable attach structure includes a fiber channel (i.e., a passageway) 112 that extends from a first opening (not numbered) at rear end 110 to a second opening (not numbered) at front end 120 for forming a pathway for optical fibers and/or conductors such as copper conductors to pass through. As shown, the fiber channel 112 generally reduces size from the rear end 110 to the front end 120 and aids in guiding the optical fiber away from the centerline as it is inserted therein. The rear end 110 also includes a barrel 118 having a generally round shape that may include one or more ridges (not numbered) as desired. Barrel 118 may be used as a crimp body for securing strength members and/or cable jacket between the crimp body and a crimp band. Moreover, the crimp band may have any suitable shape such as oval or round for fitting to the shape formed by the crimp body, strength members and jacket.

The second opening of fiber channel 112 is located off the centerline of the cable attach structure for routing the optical fiber away from the centerline of the connector (i.e., off the centerline of the connector). The front end 120 of cable attach structure 100 also includes a slot 122 for inserting and securing a portion of a circuit board that forms a portion of the connector. Simply stated, the fiber channel 112 exits the cable attach structure 100 at a position that is off-axis from the centerline of the cable attach structure 100 and the cable 10. In other words, the second opening of fiber channel 112 is located off the centerline axis of the cable attach structure 100 on one side of slot 122 for routing the optical fiber or conductors to a side of the circuit board that is inserted/attached to slot 122. In other embodiments, the cable attach structures may have more than one fiber channel that exits the cable attach structure off-axis from a centerline of the cable attach structure. Further, slot 122 of this embodiment is fashioned as a pocket (i.e., an opening) that does not extend to the lateral/side edges at the front end 120 of the cable attach structure; however, other slot can extend to the lateral/side edges of the cable attach structure as desired.

The cable attach structures disclosed herein may also include other optional features as desired. By way of example, cable attach structure 100 or other structures may optionally include one or more protrusions 119 extending from a medial portion of the body. Protrusions 119 may be used as anchors for attaching one or more strength members of the fiber optic cable thereto for strain relieving the cable as discussed herein. Other optional features are passages 123 that are disposed at the front end 120 and extend thru toward the medial portion of cable attach structure 100. Passages 123 may be used to allow components of the fiber optic cable to pass thru to the connector such as copper wire conductors or the like if the connector uses the same. Thus, the cable attach structures disclosed can have optional features that allow several different configurations of cables and/or connectors to be used with the same. Other optional features for cable attach structure 100 may include attachment features for securing a shell of the connector to structure 100. For instance, structure 100 may have one or more snap attachment features for cooperating with portion of the connector shell. The cable attach structure may also have other cavities or recesses for aiding manufacture. In other words, molded parts may have generally uniform wall thickness so there are easier to manufacture and also uses less material. Illustratively, cable attach structure 100 has a cavity 114 disposed at the rear end 110 for providing generally uniform wall thickness and using less material.

The cable attach structures disclosed herein may be used with any suitable cable configuration and/or connector configuration as desired. By way of example, FIG. 4A is an elevated view of an explanatory fiber-optic cable ("cable") 10. Cable 10 includes a jacket 20 that defines a cable central axis A1, which is shown oriented along the Z-direction. The jacket 20 has an outer surface 22 and includes a central longitudinal (axial) cavity 26 configured to support at least one optical fiber 30, with four optical fibers being shown by way of example. The optical fibers 30 have respective ends 32.

Cable 10 also includes at least one strength member 40 that runs longitudinally down the cable at an off-axis (peripheral) position between central cavity 26 and jacket outer surface 22. The jacket 20 is also shown as having a terminal end 24. In one example, cable 10 includes two peripheral strength members 40, which are shown protruding from terminal end 24 of jacket 20 and having respective ends 42. The strength members 40 are disposed on either side of central cavity 26 and reside along an imaginary line denoted L that includes cable central axis A1. Here, imaginary line L is oriented along the X-axis. This configuration provides resistance to bending of cable 10 in the X-Z plane but allows for bending in the Y-Z plane. In an example, central cavity 26 is elongated in the Y-direction to provide room for optical fibers 30 to move and adjust their position when cable 10 is bent in the Y-Z plane. However, other cable designs with different components, shapes and/or sizes are possible with the concepts disclosed herein.

Example strength members 40 include members that may provide anti-buckling strength to cable 10, but other strength member characteristics are possible as desired for the fiber optic cable assembly design. Additionally, the strength members 40 may also have other functions beside providing tensile strength if desired such as acting as conductors. Example materials for strength members 40 include stranded stainless steel, copper and aramid fibers such as KEVLAR, fiberglass, and the like. For instance, the concepts disclosed may be used with fiber optic cables having strength members that generally lack anti-buckling characteristics such as aramid yarns or the like. Other variations of cable may use two different types of strength members such as aramid yarns in the cavity and metallic wires embedded in the cable jacket.

Figure 4B:
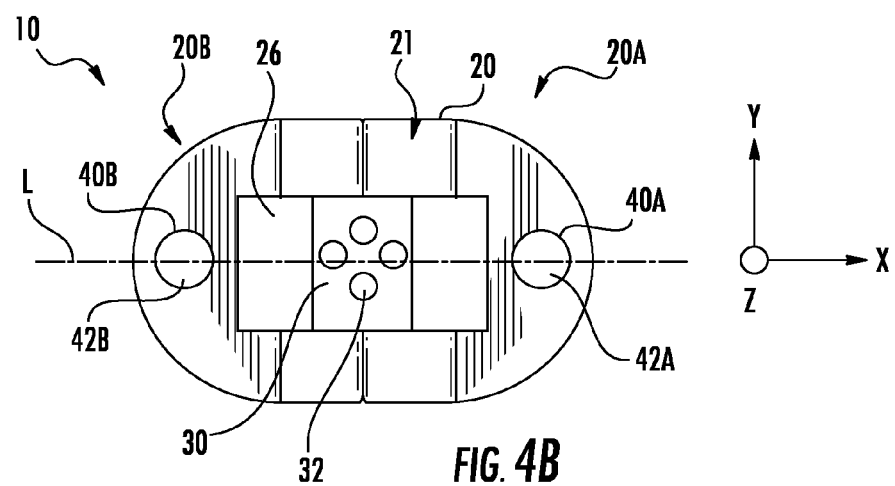
FIG. 4B is an end-on view of the fiber optic cable of FIG. 4A having jacket split ends, where each split end includes a strength member extending therefrom.

FIG. 4B is an end-on view of cable 10 prepared for attachment to the cable attach structure. FIG. 4B shows jacket 20 that is split at terminal end 24 to form first and second jacket split ends 20A and 20B. The first and second jacket split ends 20A and 20B define a slit opening 21 in jacket 20. As shown, the jacket split ends 20A and 20B each include one strength member 40 that extends from terminal end 24. The strength members 40 associated with jacket split ends 20A and 20B are hereafter respectively denoted as strength members 40A and 40B, with their respective ends denoted as 42A and 42B. The at least one optical fiber 30 also extends from terminal end 24. This allows for strength members 40A and 40B to be laterally separated and used to perform a securing function, as described below, while also allowing the at least one optical fiber 30 to be routed in a select manner, also as described below.

Figure 5:
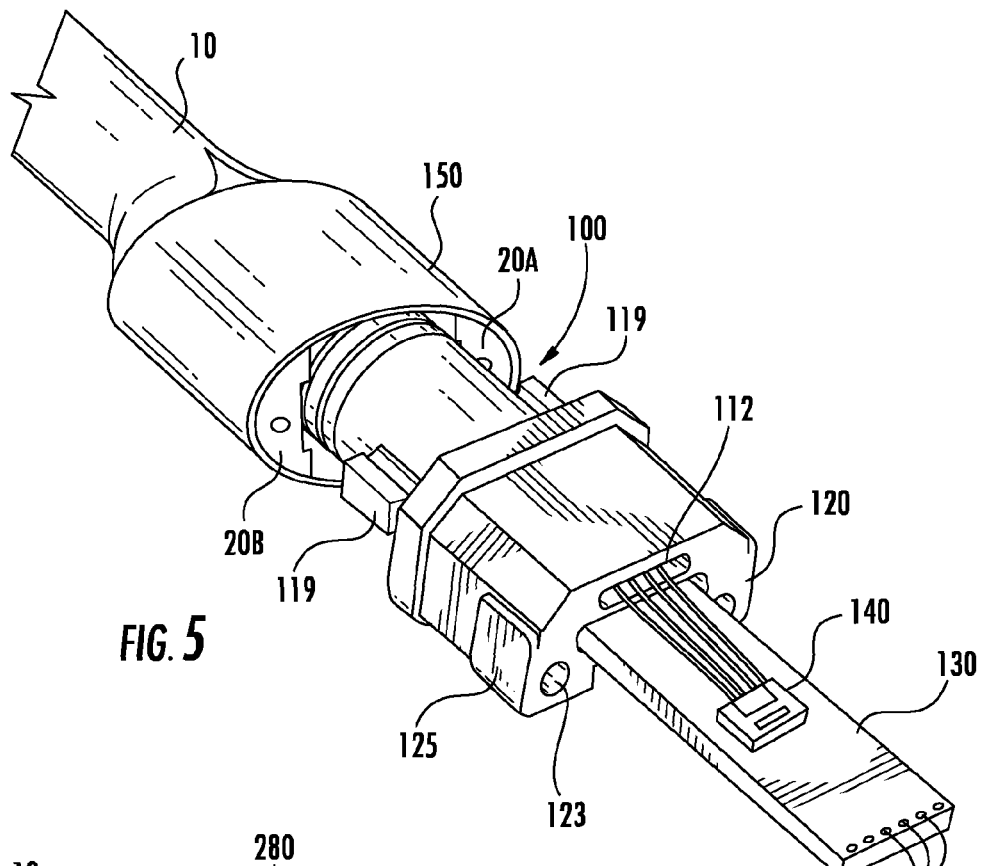
FIG. 5 is a perspective view of the cable attach structure of FIGS. 1-3 being a portion of a fiber optic cable assembly having a cable attached to the rear end and a circuit board at the front end.

FIG. 5 is a perspective view of the cable attach structure 100 being a portion of an explanatory fiber optic cable assembly having cable 10 attached to the rear end 110 and a circuit board 130 at the front end 120. As shown, cable 10 as shown prepared in FIG. 4B is secured to barrel 118 at the rear end 110 of cable attach structure 100 using a crimp band 150. Specifically, crimp band 150 is threaded over the cable 10 and optical fibers 30 of cable 10 are inserted into the first opening at the rear end 110 and through fiber channel 112 so that the optical fibers 30 extend beyond the second opening of fiber channel 112 at the front end 120. Thereafter, the cable 10 is positioned so that jacket split ends 20A and 20B each having respective strength members 40A and 40B are disposed about the barrel 118 as shown. Once cable 10 is fully seated on the barrel 118 at the rear end 110 of the cable attach structure, the crimp band 150 is slid forward over the jacket split ends 20A and 20B and then deformed (i.e., crimped) so that the jacket split ends 20A and 20B are secured between barrel 118 and crimp band 150 as shown. Since strength members 40 are embedded in the jacket split ends 20A and 20B the strength members 40 are strain relieved to the cable attach structure by crimp band 150. In other words, a portion of the first strength member and/or a portion of the second strength member are secured by the crimp band. It is noted that this embodiment does not use optional protrusions 119 for securing strength members, but that protrusions 119 may be used with other embodiments.

As depicted in FIG. 5, the cable attach structure 100 routes the optical fibers 30 away from the centerline of the connector (e.g., such as above or below the circuit board 130) using fiber channel 112. Simply stated, fiber channel 112 is tapered (see FIG. 3) so that the optical fibers 30 are routed off-axis in the fiber channel 112 (i.e., away from the cable central axis A1 of cable 10 and away from the connector centerline) for attachment to a suitable component of the connector. Generally speaking, circuit board 130 of this embodiment is located at or near the centerline of the connector, thereby allowing components to be mounted on either side of the circuit board 130 and allowing easy electrical and mechanical attachment of the connector nose piece to the circuit board having the electrical contact pads 132 at the front end of the circuit board 130. Moreover, since the optical fibers 30 are routed off-axis using the cable attach structure 100 and positioned and routed so any sharp bends in the optical fibers 30 are avoided when routed to the connector the optical performance is advantageously preserved. Other embodiments for the routing the optical fibers 30 off-axis from the cable central axis A1 and connector centerline are also possible such as disclosed herein. Further, the cable attach structures discloses also provide one or more features for securing a circuit board of the connector thereto.

The fiber optic cable assemblies disclosed are active optic cable assemblies meaning that the connector performs optical-to-electrical signal (O-E) conversions or electrical-to-optical (E-O) signal conversions depending on the direction of the signal. Simply stated, the connector includes active electrical components mounted to the circuit board in the connector for signal conversions. In other words, the connectors have an electrical interface (i.e., electrical contacts)

disposed at the front of the connector for making an electrical connection with a host or client device and the connector converts the electrical signals to/from the host or client device to an optical signal for transmission along the optical fibers of cable. In this embodiment, the optical fibers 30 are attached to an optical module such as a total internal reflection (TIR) module 140 as generally known in the art. The optical module, at least one optical lens, a lead frame or the like places the optical fibers in optical communication with the active components of the connector. By way of example, the TIR module receives and secures the optical fibers 30 and then turns and guides the light signal of the optical fibers 30 toward the active optical devices (not visible) such as photodiodes and/or vertical-cavity surface-emitting lasers (VCSELs) mounted on the circuit board 130. The TIR module typically includes a lens aligned over each active components for expanding or focusing the optical signal; however, other embodiments may have other structures for transmitting optical signals to the active components without turning the optical signal for instance the connector may have at least one lens for expanding or focusing the optical signal. Moreover, the TIR module 140 may be a single component that is mounted to the circuit board 130 as shown or multi-piece component as disclosed herein. Of course, other variations for the optical fiber alignment and attachment are possible such as having the optical fibers aligned directly to the active components such as in a lead frame, the optical fibers may be attached directly to an integrated chip, or the optical fibers may be attached directly to an optical path of the circuit board as desired.

As shown, the slot 122 of cable attach structure 100 receives a rear portion of circuit board 140 therein and may be secured to the same using any suitable means. By way of example, circuit board 130 may have a mechanical attachment such as a snap-fit between the circuit board and structure disposed in the slot 122 or an adhesive attachment such epoxy, glue, or the like. Other mechanical attachments that use further components are also possible such as pins received in both the cable attach structure and pass through openings in the circuit board (see FIG. 8). In this embodiment, the ends 32 of optical fibers 30 are inserted into the TIR module 140 and secured using an adhesive or the like. The optical alignment of the TIR module 140 to the active components on circuit board 130 may be performed before or after the optical fibers 30 are attached to the circuit board 130 as desired using passive and/or active alignment techniques for aligning the lens on the bottom of the TIR module with the active components on circuit board 130.

Figure 6:
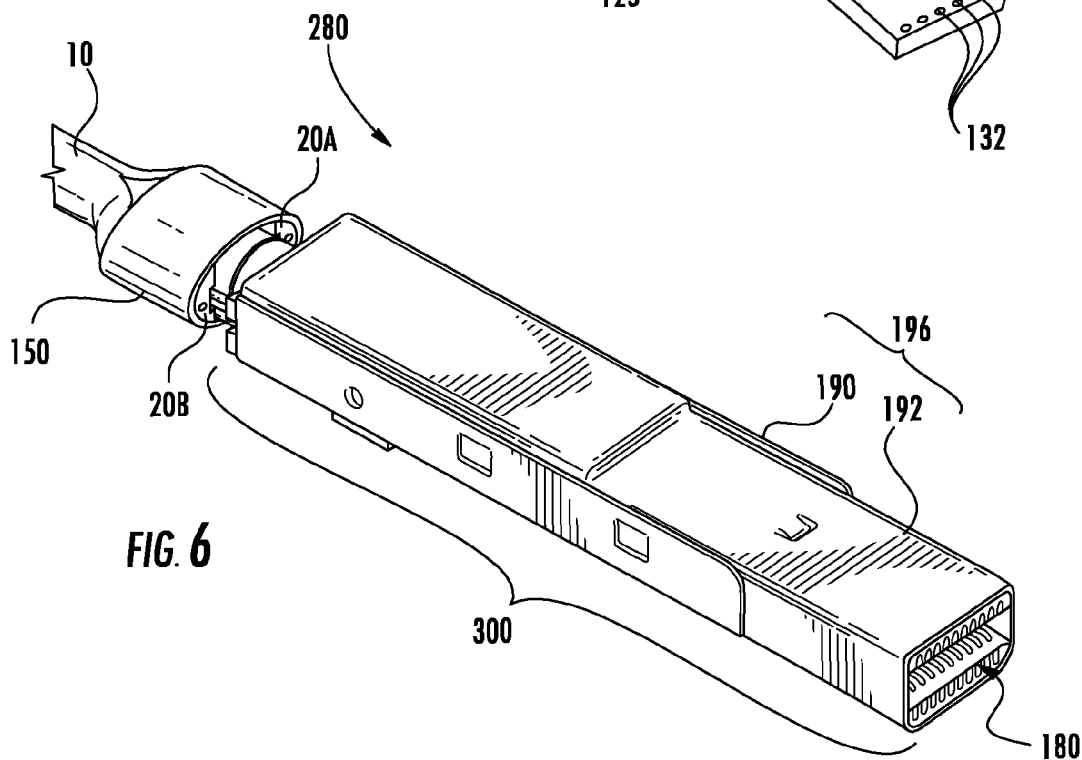
FIG. 6 is a perspective view of the cable attach structure of FIGS. 1-3 being a portion of a fiber optic cable assembly having a cable attached to the rear end and a connector at the front end.

FIG. 6 is a perspective view of the cable attach structure 100 of FIG. 5 after attaching a connector nose piece 180 to circuit board 130 and attaching a portion of a multi-piece shell to the fiber optic cable assembly. Connector nose piece 180 includes a body 174 made from a dielectric and a plurality of electrical contacts 176 that are attached to the connector nose piece 180. When assembled, the plurality of electrical contacts ZZZ are electrically connected to the electrical contact pads 132 at the front end of the circuit board 130, thereby electrically connecting the circuit board 130 to the electrical interface of the connector SSS. FIG. 6 has a top portion of the shell removed for clarity, but the top portion of the shell is attached to the lower portion of the shell and an outer housing may be attached over a portion of the shell for protecting the same while leaving a portion of the shell and the opening of the connector nose piece exposed at the front end of the connector for plugging into a receptacle of a host or client device. The outer housing may be an overmolded portion, a snap-on or a slide-on sleeve for forming the outer housing that fits about a portion of the shell and/or assembly for insulating and protecting the same.

Figure 7:
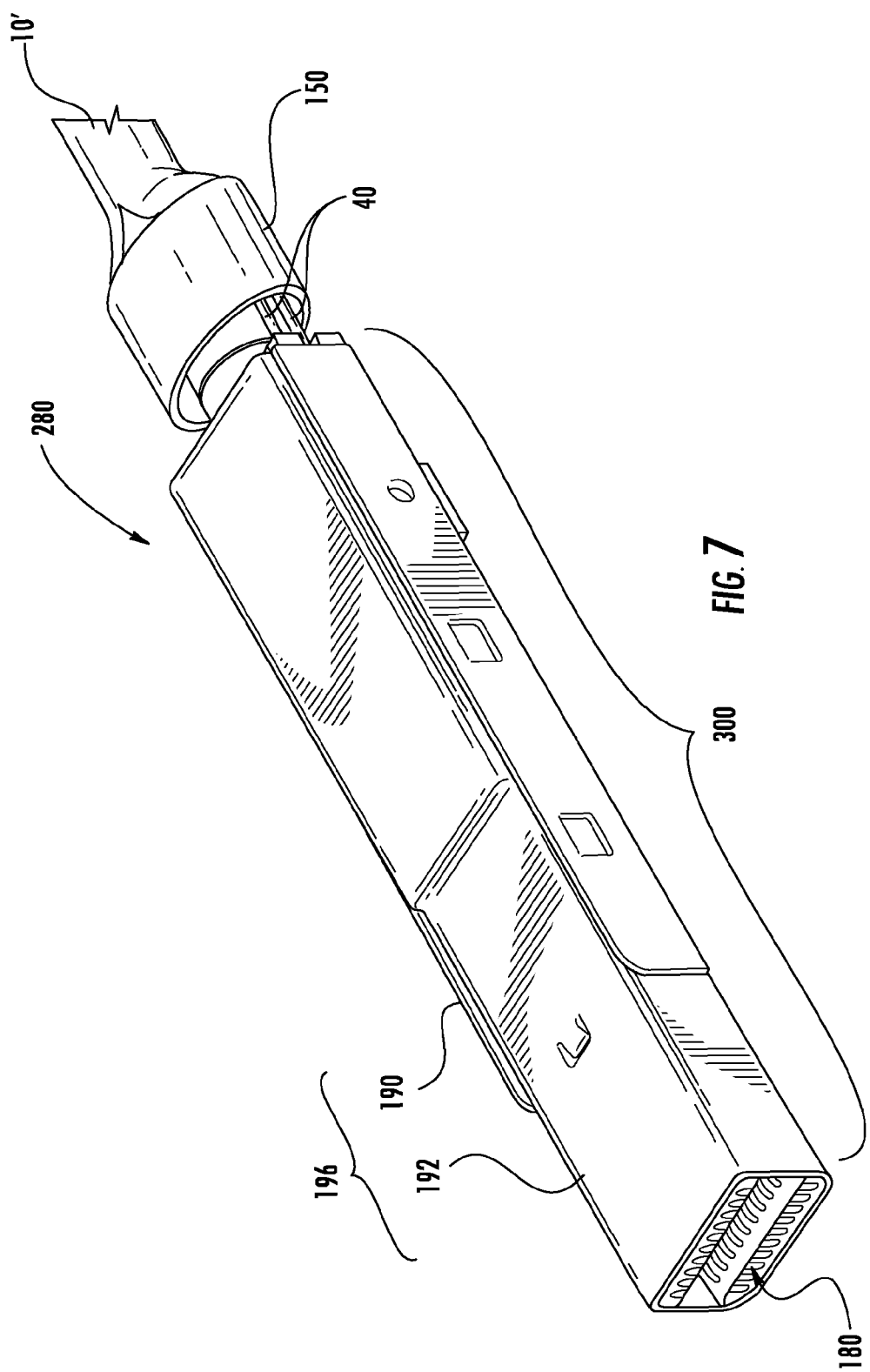
FIG. 7 is a perspective view of another fiber optic cable assembly having a connector.

FIG. 7 is a perspective view of another explanatory fiber optic cable assembly 280 that is similar to fiber optic cable assembly of FIGS. 5 and 6 and has a cable attach structure 200 and a connector 300. As shown, cable attach structure 200 has a body with a cable 10' attached at the rear end 110 and a connector adjacent to the front end 120. Specifically, FIG. 7 shows an assembled AOC connector with both portions of shell 196 attached and prior to an outer housing (not shown) being installed such as by overmolding or sleeving over the shell. Cable 10' is similar to cable 10 expect the strength members 40 are high-strength stranded metallic tensile strength elements such as stainless steel or the like that are highly flexible so they can be secured to protrusions 119 extending from a medial portion of the cable attach structure 200. In other embodiments, strength members 40 may be stranded aramid yarns such as Kevlar® or the like as desired. Like the other embodiments, jacket 20 of cable 10' is split so that jacket split ends 20A and 20B each include respective strength members 40A and 40B that are disposed about the rear end 110 and secured between crimp band 150 and barrel 118 of cable attach structure as shown. In other words, since strength members 40 are embedded in the jacket split ends 20A and 20B the strength members 40 are strain relieved to the cable attach structure by crimp band 150 along with also being optionally wrapped about protrusions 119 as shown.

As shown, protrusions 119 are arranged in pairs that are disposed about 180° apart (i.e., on opposite side of the body) so that pulling forces acting on the strength members are generally balanced on both sides of the cable attach structure, but single protrusions 119 on each side are also possible. Each protrusion 119 is configured so that the strength members can be secured thereto, e.g., wrapped around, wrapped though or both wrapped around and through as desired. In other words, protrusions 119 support a partial wrap, a single wrap, or multiple wraps as desire. Further, an adhesive or the like may also be used on the strength members/protrusion after wrapping for keeping the strength members in place. Of course, it is possible to secure strength members 40 to protrusions 119 without the use of a crimp band 150 and the crimp band 150 may be use without attaching strength members 40 to protrusions 119 such as shown in FIGS. 5 and 6.

Figure 8:
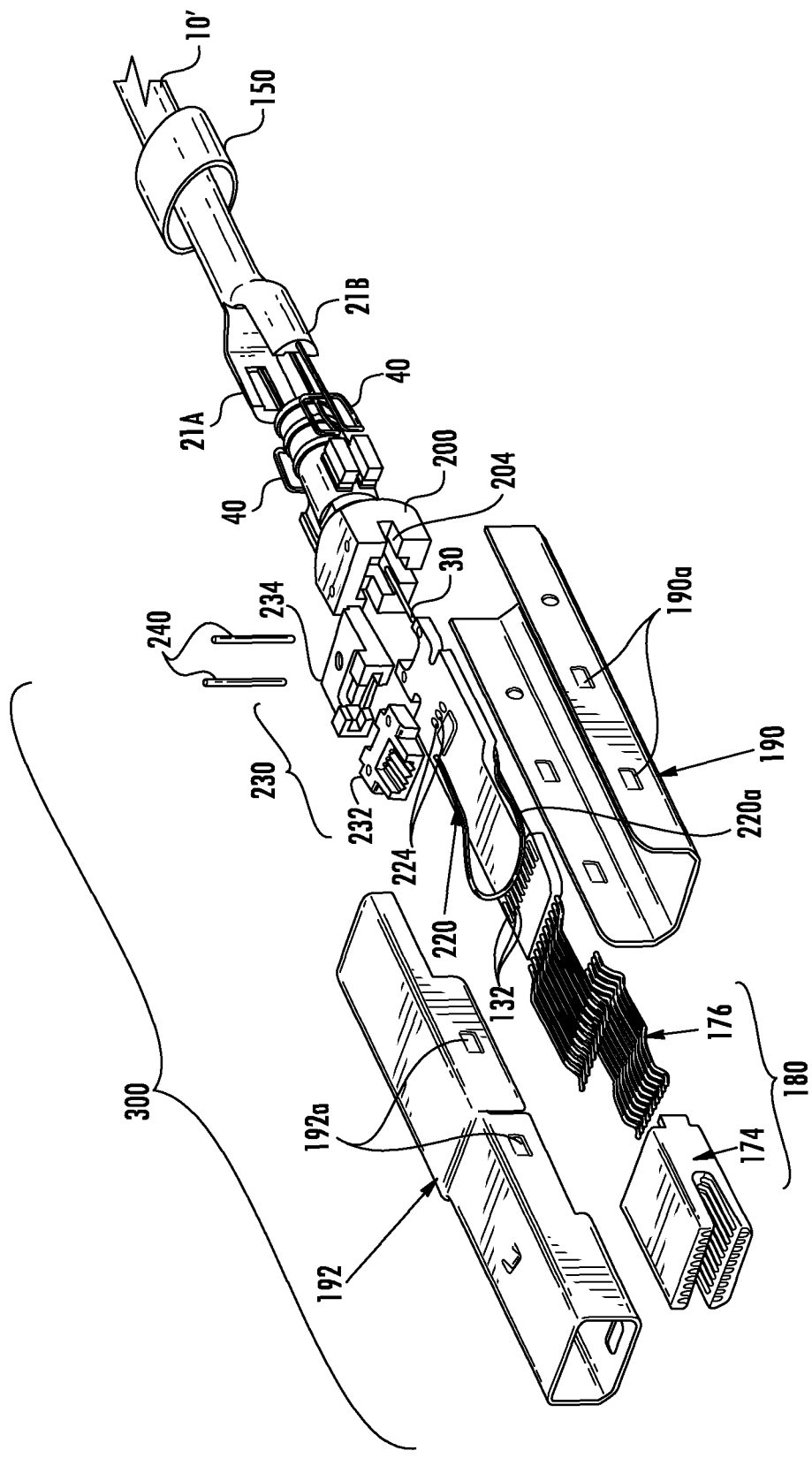
FIG. 8 is a partially exploded view of the fiber optic cable assembly of FIG. 7.

FIG. 8 is a partially exploded view of fiber optic cable assembly 280 shown in FIG. 7 and only shows a single optical fiber routed from cable 10' for clarity. Fiber optic cable assembly 280 includes a cable 10', a crimp band 150, a cable attach structure 200, and a connector 300 including a connector nose piece 180 having a body 174 and a plurality of electrical contacts 176, a shell 196 having a bottom portion 190 and a top portion 192, a circuit board 220, an optical module such as TIR module 230, and one or more pins 240 for securing circuit board 220 to the cable attach structure. Cable attach structure 200 is similar to cable attach structure 100, but further includes bores 205 near the front end sized for receiving pins 240 that pass through complimentary bores on circuit board 220 for securing the circuit board 220 to the cable attach structure 200. Bores 205 extend from the top surface towards the bottom of the cable attach structure 200 and may or may extend all the way to bottom surface of the body as desired. As disclosed herein, pins 240 could include knurling, ridges, threads and/or other features for securing the pins 240 in the cable attach structure 200 in a reliable manner and securing circuit board 220.

Pins 240 also could use a friction fit or adhesive for reliably securing the same and attaching the circuit board 220.

With continuing reference to FIG. 8, cable attach structure 200 also includes a slot 204 for positioning and receiving the rear end of circuit board 220. In this embodiment, slot 204 extends in the transverse direction to the sides of cable attach structure 200 as shown. Circuit boards disclosed herein include electrical contact pads 132 at the front end of the circuit board for electrical connection to connector nose piece 180, electrical traces (not visible) and active components 224 such as photodiodes, VCSELs or integrated circuits. When assembled, the connector nose piece 180 supports the front end of circuit board 220 and is the electrical interface for a host or client device. Specifically, the electrical contacts 176 have a first end that attaches to respective electrical contact pads 132 on circuit board 220 and a second end of electrical contacts 176 are disposed in body 174 of connector nose piece 180 as the electrical interface for the host or client device. Body 174 is made of a dielectric material such as a polymer or the like. In this embodiment, electrical contacts 176 are spring-loaded and act as a wiping electrical contact as the circuit board is inserted into the connector nose piece 180; however, in other embodiments the electrical contacts 176 of connector nose piece 180 are soldered to the electrical contact pads 132 on circuit board 220. Connector 300 also includes shell 196 having bottom portion 190 and top portion 192 that snap-fit together. The connector nose piece 180 of the assembly can be inserted and slid forward into the top portion 192 of shell 196 until fully seated and then the bottom portion 190 of the shell is attached. Specifically, a plurality of protrusions 192a disposed on top portion of the shell snap-fit into complimentary windows 190a disposed on the bottom portion 190 of the shell. The connector 300 may also include a suitable outer housing (not shown) over a portion of the shell and rearward over the cable attach structure and a portion of the cable such as by overmolding or sleeving or the like and a boot and/or heat shrink for cable bend relief as desired. Also, the slit opening 21 in jacket 20 formed by jacket split ends 20A and 20B can be sealed using a sealing means such as UV-curable silicone, heat-shrink tubing, overmolded polymer, etc if desired.

As shown by FIG. 8, the TIR module 230 of connector 300 is formed from a fiber tray 232 and lens block 234. Fiber tray 232 aligns and precisely fits to lens block 234 so that the optical fibers can be attached to fiber tray 232 and lens block 234 may be precisely aligned to active components 224 on circuit board 220. Consequently, the cable attach structure 200 having the cable attached can be processed on a separate line from the circuit board assembly and then the fiber tray 232 and lens block 234 may be mated together when the respective assemblies are finished, thereby making manufacturing more efficient. Fiber tray 232 includes guides for receiving and aligning optical fibers 30 into a predetermined portion on the fiber tray so that they will align with the optical channels on lens block 234 when mated together. Lens block 234 includes structure for aligning and receiving the fiber tray 232 in a suitable location. Lens block 234 also include the total internal reflection surface for turning the optical signals and a plurality of lens on a bottom surface for suitable expanding the optical signal for the active components 224 disposed on the circuit board 220.

As shown in FIG. 8, optical fibers 30 enter the connector 300 from a first direction and attaches to the connector in a second direction. More specifically, the optical fiber 30 enters and is routed to the front of the connector and then is attached to a fiber tray 232 of the TIR module 230 in a second direction that is pointed to the rear of the connection. Simply stated, the first direction is opposite from the second direction. In other words, optical fiber 30 makes a reverse fiber loop within the connector 300 and makes about a one-hundred and eighty (180 degree) turn. Consequently, optical fiber 30 has extra slack length for accommodating fiber movement and/or allow adequate length for processing and/or rework as necessary. Additionally, in this embodiment optical fiber 30 enters the connector 300 below circuit board 220 (i.e., enters the connector on a first side of the circuit board) and attaches to the TIR module 230 above the circuit board 220 (i.e., attaches to the connector on a second side of the circuit board). Further, the circuit board 220 also includes an optional notch 222 for making a transition from the first direction to the second direction. Stated another way, optical fiber 30 passes through notch 222 as it transitions from the first direction to the second direction and changes directions to make the reverse fiber loop. Other fiber routing arrangements are also possible with the concepts disclosed herein.

Figure 9:
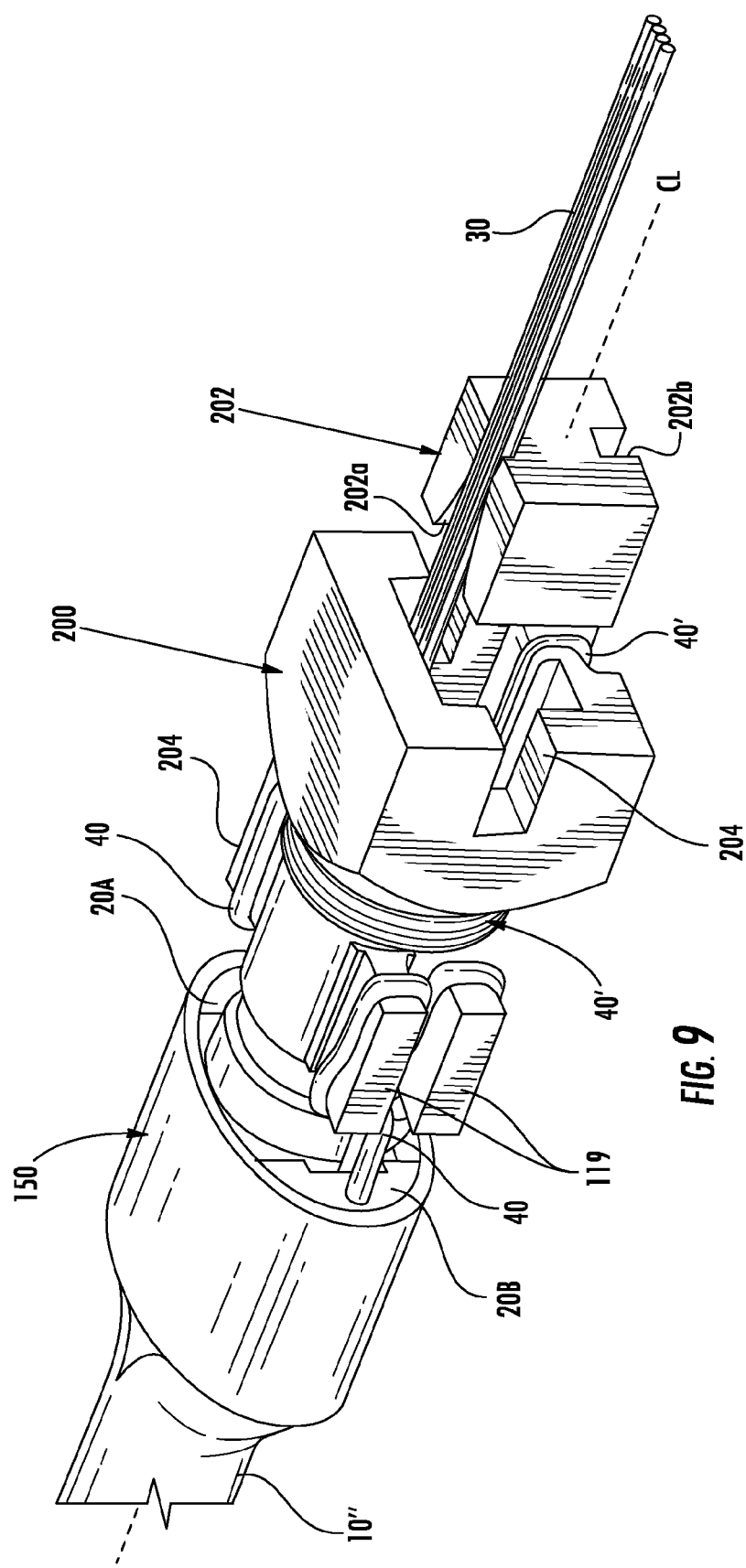

FIGS. 9-11 are detailed views of another fiber optic cable assembly using cable attach structure 200 that further includes an insert 202 for aiding off-axis optical fiber routing. As best shown in FIG. 9, insert 202 is positioned in front of the body of the cable attach structure 200. Insert 202 includes one or more guide slots 202a for directing the position of components such as the optical fibers 30. Moreover, guide slots 202a may include a funnel-shaped entry for transitioning the fibers into the guide slot 202a, but other shapes are possible. In this particular embodiment, insert 202 has an upper guide slot 202a and a lower guide slot 202b for positioning components of the cable in an off-axis position from a longitudinal centerline of the cable and a longitudinal centerline of the cable attach structure 200. Additionally, the cable 10" which is similar to cable 10' is shown further including aramid strength members 40' that are disposed in the cavity 26 of the cable. Typically, the cable has stranded strength members or aramid strength members 40', but usually not both. Cable 10" shows both types of strength members 40 and 40' to illustrate how different types of strength members may be secured to the cable attach structure 200 depending on the type of strength members in the cable. Cable has aramid strength members 40' routed through a longitudinal passageway of the cable attach structure 200 that extends from a rear end to a front end and then routed toward the rear end of the body and wound about a medial portion as shown. Strength members 40' are aligned to the lower guide slot 202b of insert 202, which may or may not be keyed to passageway of the cable attach structure 200 as desired. Strength members 40' could be bonded behind the front shoulder, but bonding would need to occur in a manner that did not have a sharp angle to inhibit breakage of the strength members 40'. In other words, if this type of optional strain relief is used there generally is not excessive angular component to the tensile load at the point at which the strength members 40' are bonded.

FIGS. 10 and 11 depict insert 202 installed into cable attach structure 200 with optical fibers 30 and strength members 40' routed along different paths of the insert that are both off-axis relative to a centerline of the cable attach structure/cable from different perspectives. Specifically, optical fibers 30 are routed above a centerline CL (i.e., off-axis) and strength members 40' routed below centerline CL. In other words, insert 202 routes optical fibers 30 to one side of the circuit board and strength members 40' are routed to the other side of the circuit board when assembled. Strength members 40' may be secured with or without an adhesive as desired at one or more suitable locations of the pathway. For instance, adhesive may be injected into lower guide slot 202b and/or other locations if desired. Consequently, the addition of adhesive is located far enough away from optical fibers 30 for inhibiting unintentional bonding of the optical fibers, which could be problematic. Insert 202 has a suitable size and shape to conform with the size and shape of the opening at the front end of the cable attach structure such as rectangular or square. Further, insert 202 may include a slot near the middle of insert 202 based on the shape of the circuit board for receiving and securing an end portion of the circuit board as desired. Other embodiments of the fiber optic cable assembly could include electrical conductors such as copper wires that are routed past the cable attach structure and routed to the circuit board.

Figure 12:
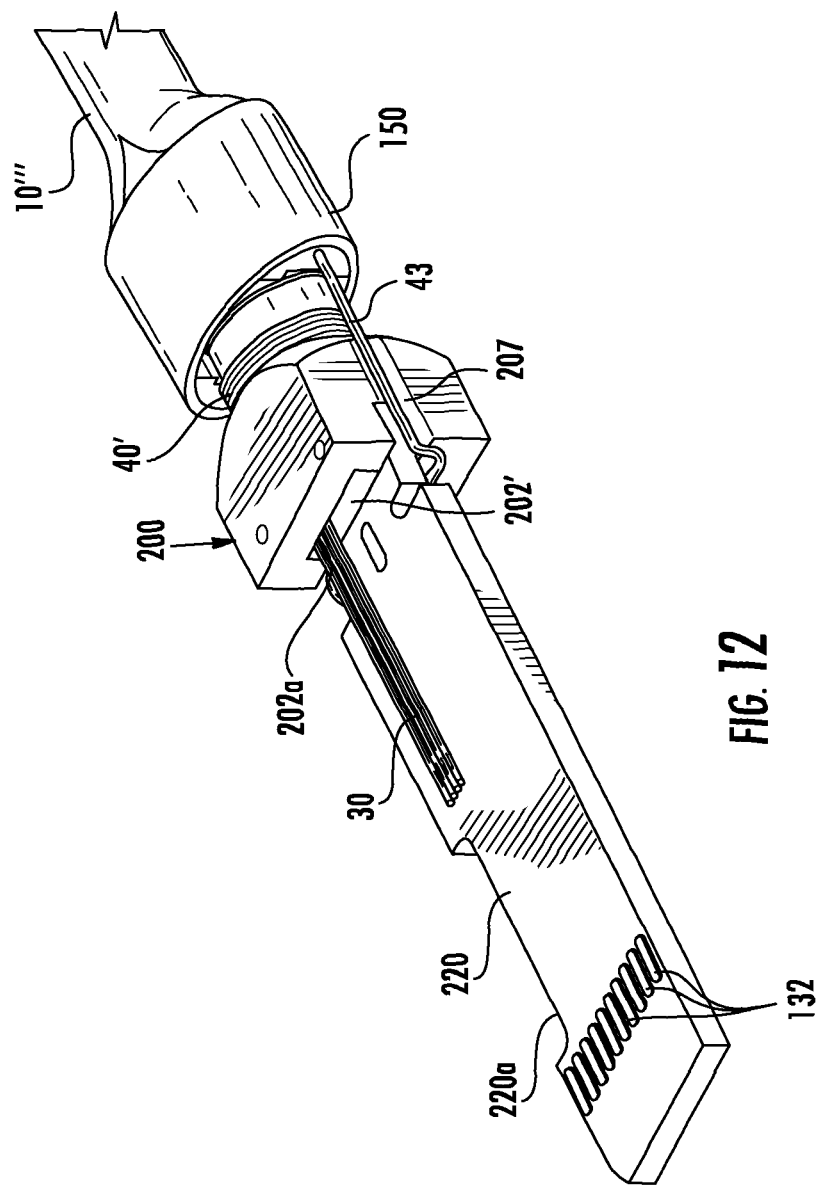
FIG. 12 is a perspective view of another variation of a cable attach structure having a plurality of pathways or guide slots with a circuit board attached.
Figure 14:
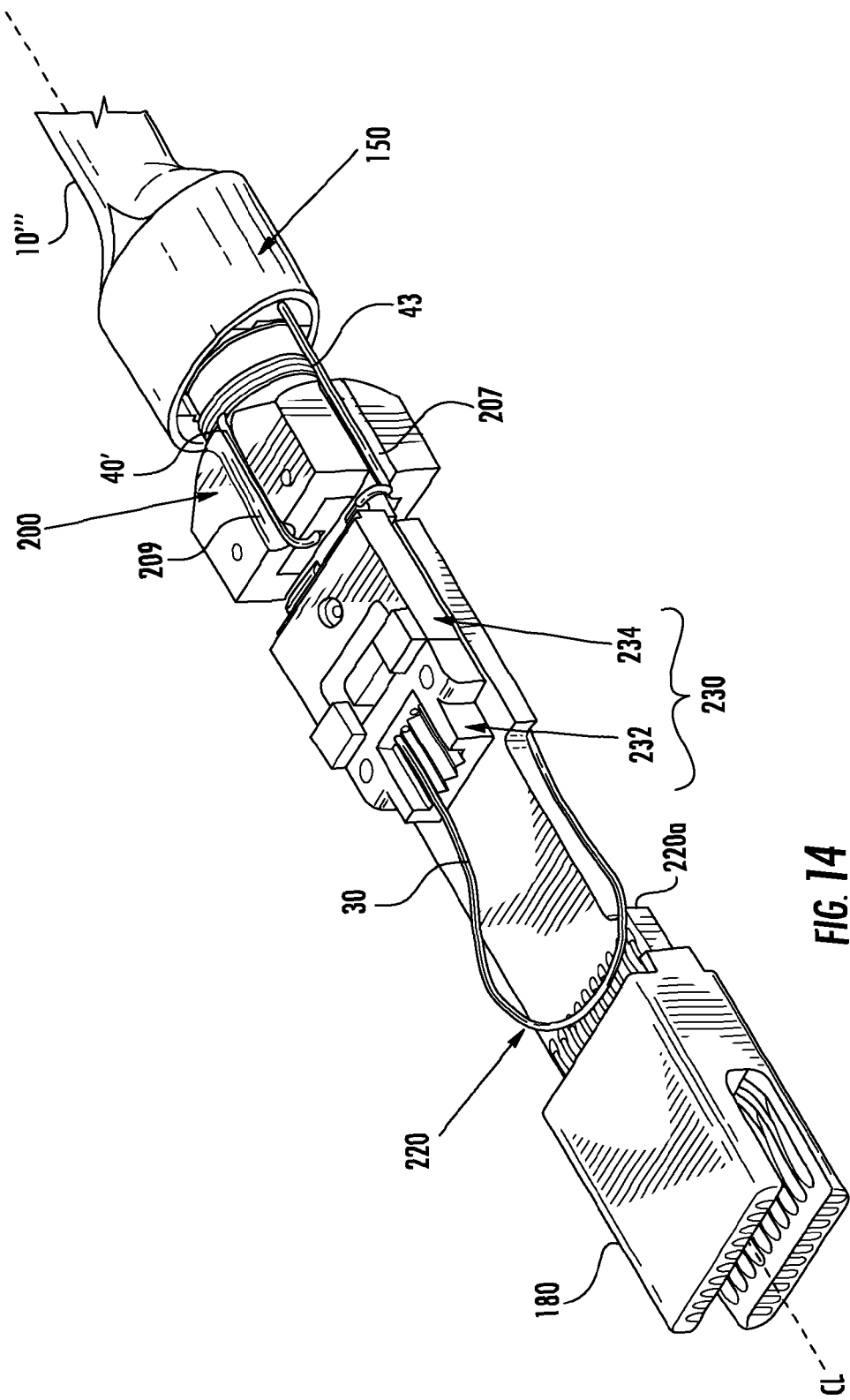
FIG. 14 is a bottom perspective view of FIG. 12 showing components attached to the circuit board for forming the connector adjacent to the front end of the cable attach structure.

FIG. 12 is a perspective view of another variation of a cable attach structure similar to the previous embodiment having an insert 202' showing circuit board 220 attached and including one or more electrical conductors. In this embodiment, insert 202' includes upper guide slot 202a and a lower guide slot (not numbered) for positioning components of the cable in an off-axis position from a longitudinal centerline of the cable and a longitudinal centerline of the cable attach structure 200; however, upper guide slot 202a is positioned in the upper left corner (i.e., the northwest position when viewing from the front). Consequently, optical fibers 30 are routed to a side of the circuit board 220 which may be advantageous if the circuit board if a specific routing pattern is desired. As shown, insert 202' also includes a slot (not numbered) near the middle for receiving and securing a portion of circuit board 220. In this embodiment, circuit board 220 also includes a notch 220a for making a transition of the optical fibers 30 from the first direction to the second direction and routing the optical fibers 30 on both sides of circuit board 220. However, embodiments can have optical fibers 30 on one side of the circuit board that do not reverse directions such as shown in this embodiment. In other words, the optical fibers are routed to the active components on the same side of the circuit board 220 as they exit the cable attach structure 200. Cable 10''' of this embodiment also includes electrical conductor 43 that is routed past a clearance groove 207 on a side of cable attach structure 200 and a second conductor (not visible) is likewise routed past a second clearance groove on the opposite side of the cable attach structure. Electrical conductors 43 are routed to an electrical contact disposed on circuit board 220 as best shown in FIG. 14 and may provide power or an electrical signals as desired.

Figure 13:
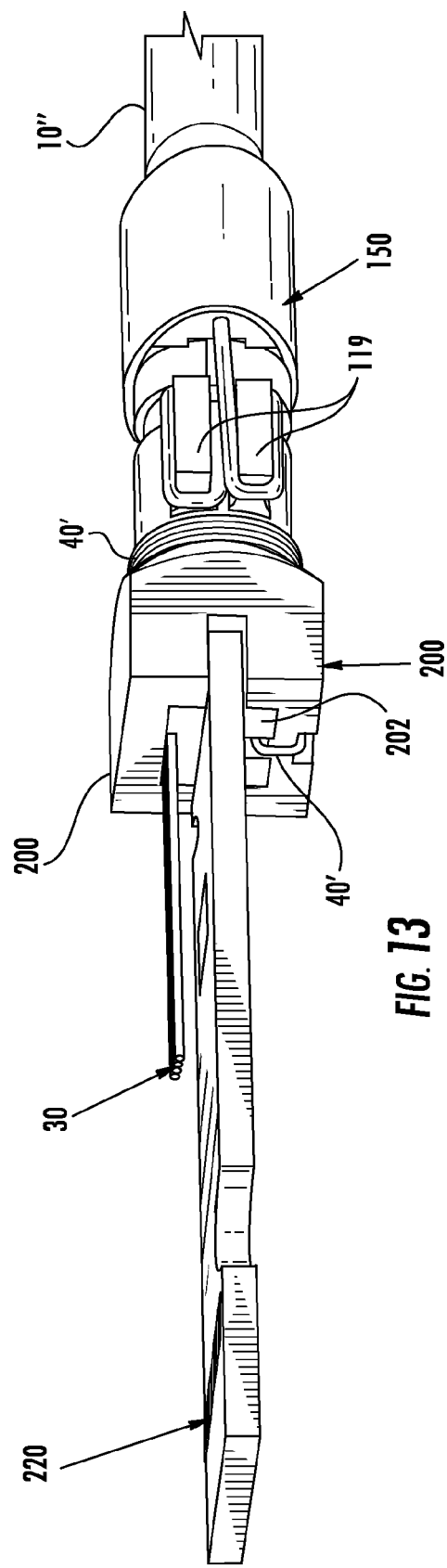
FIG. 13 is a side perspective view showing the routing of the optical fibers off the centerline of the cable attach structure and to one side of the circuit board.

FIG. 13 is a side perspective view showing the method of assembly for routing the optical fibers 30 off-axis from the centerline CL of the cable attach structure 200 and to one side of the circuit board 220 for an embodiment similar to FIGS. 9-11. In other words, optical fibers 30 and strength members 40' are routed off-axis to opposite sides of circuit board 220 using insert 202 as is it positioned in the cable attach structure 200. Thereafter, the circuit board 220 may be attached to the cable attach structure 200/insert 202 using suitable methods such as adhesive, pins, and/or a snap-fit as desired.

Figure 17:
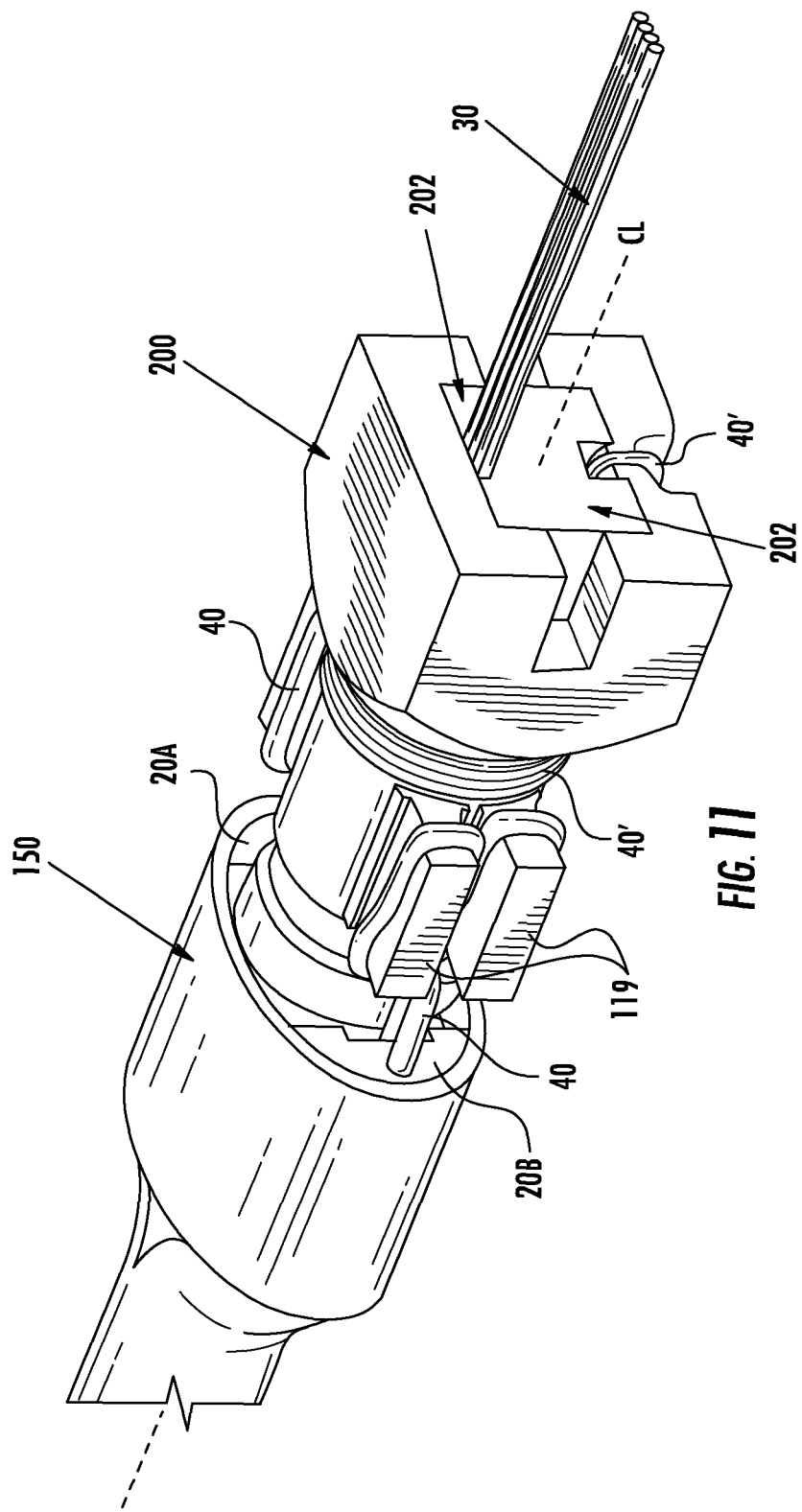
Figure 15:
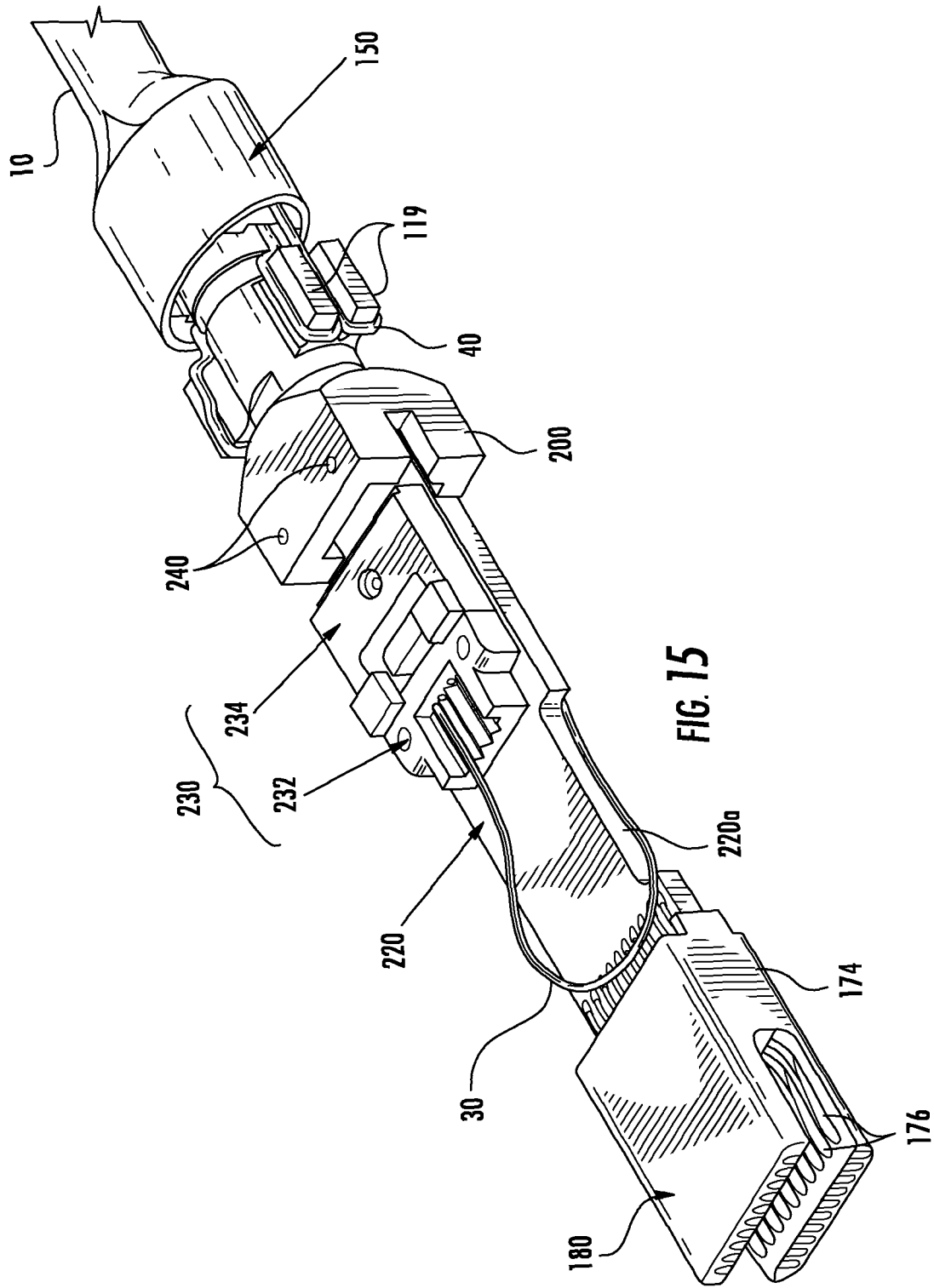
FIG. 15 is a perspective view showing components attached to the circuit board for forming the connector adjacent to the front end of another cable attach structure where the strength members of the cable are attached to protrusions of the cable attach structure.

Next, other components are assembled to the circuit board 220 for forming the connector 300 of the fiber optic cable assembly. FIG. 14 is a bottom perspective view of the embodiment showing components attached to the circuit board for forming the connector 300 adjacent to the front end of the cable attach structure 200. Specifically, connector 300 is shown assembled with the shell removed for clarity. As depicted, strength members 40' are shown disposed and routed rearward in a clearance groove 209 and wrapped about the barrel of the cable attach structure 200. One optical fiber 30 is shown entering the connector on the first side of the circuit board 220 (and off-axis from centerline CL) and attaches to the connector on the second side of the circuit board 220. As shown, optical fiber 30 passes through notch 220 for making the transition from the first direction to the second direction as it attaches to TIR module 230. TIR module 230 is shown with fiber tray 232 aligning and precisely fitting into lens block 234 so that the optical fibers for aliment of the optical channels with the active components 224 on circuit board 220. As shown, fiber tray 232 includes a plurality of guides (not numbered) for receiving and aligning optical fibers 30 into a predetermined portion on the fiber tray so that they will align with the optical channels on lens block 234 when mated together. As shown, a portion of fiber tray 232 fits into lens block 234 and has structure for aligning and receiving the fiber tray 232 in a suitable location to the lens block 234. Lens block 234 has the total internal reflection surface that turns the incoming optical signals to the respective lens on a bottom surface of the lens block 234 for suitable expanding the optical signal for the active components 224 disposed on circuit board 220. Additionally, connector nose piece 180 is electrically attached to the front end of circuit board 220 for providing the electrical interface of the connector for the host or client device. Likewise, FIG. 15 is a perspective view showing components attached to the circuit board for forming the connector adjacent to the front end of for the embodiment of FIG. 8. Specifically, FIG. 15 shows circuit board 220 attached using pins 240 and the optical fiber having a reverse loop routing for changing directions of the optical fiber in the connector. As used herein, reverse loop routing means one or more optical fibers enter the connector from a first direction and attach to the connector in a second direction. In this embodiment, the reverse loop routing is used with the optical fiber being routed away from the centerline of the connector in an off-axis configuration. FIG. 16 is a top rear perspective view of fiber optic cable assembly of FIG. 14 and FIG. 17 shows a bottom perspective view showing further optional details of the design. Specifically, FIG. 17 is a detailed view showing an optional relief area (i.e., a well) 211 for applying adhesive or epoxy for securing strength members 40'. The relief area or well 211 indicates to assemblies or automated assembly lines where to place the adhesive/epoxy and well as providing an input for the volume of adhesive/epoxy to apply for adequately securing the strength members 40'.

Figure 18:
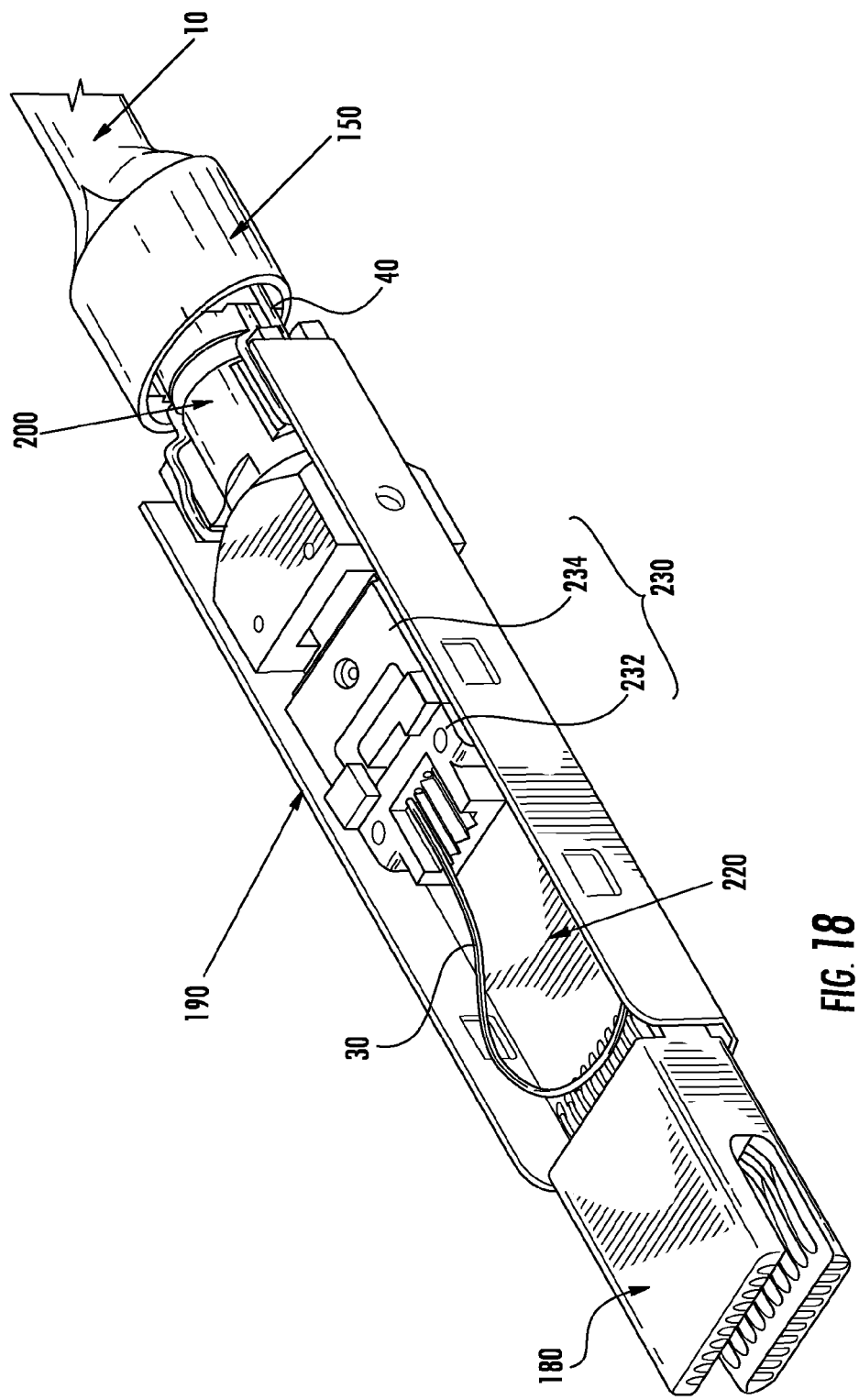
FIG. 18 is a top perspective view of the fiber optic cable assembly of FIG. 15 disposed within a portion of the connector shell.
Figure 19:
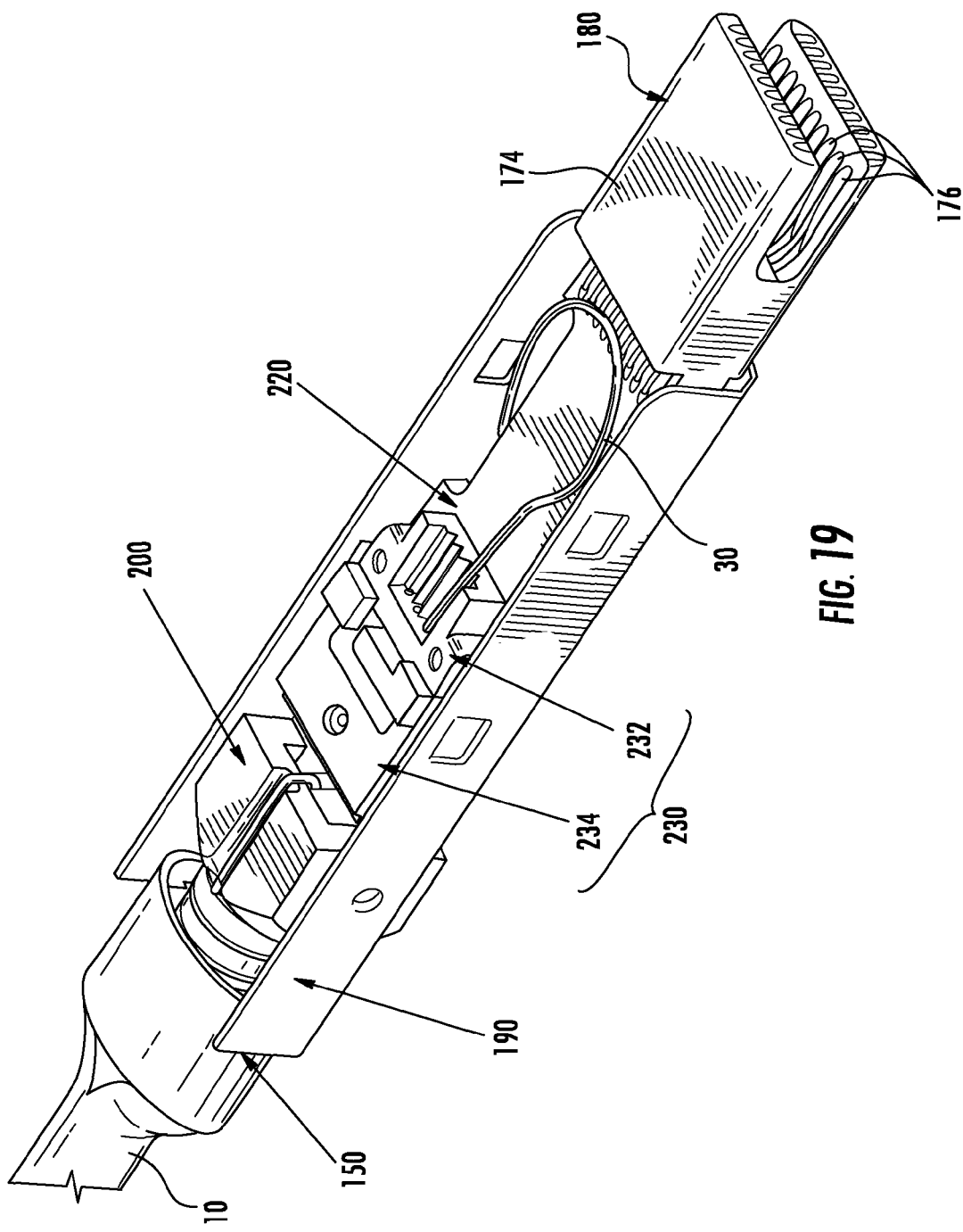
FIG. 19 is a top perspective view of the fiber optic cable assembly of FIG. 14 disposed within a portion of the connector shell.

Next in the assembly process the shell is added for protecting the components within the connector. FIG. 18 is a top perspective view of the fiber optic cable assembly of FIG. 15 disposed within a bottom portion of the connector shell 190. As shown, a portion of cable attach structure 200 fits within shell 190 and may securely attach to the shell for inhibiting movement such as using a friction fit, a shoulder and/or a protrusion that snap-fits to a window of the shell as desired. Likewise, FIG. 19 is a top perspective view of the fiber optic cable assembly of FIG. 14 disposed within a portion of the connector shell 190. Thereafter, the top portion of the shell may be fitted (i.e., secured) with the bottom portion of the shell for before an outer housing, heat shrink or other structure is applied as desired for finishing the connector.

Figure 20:
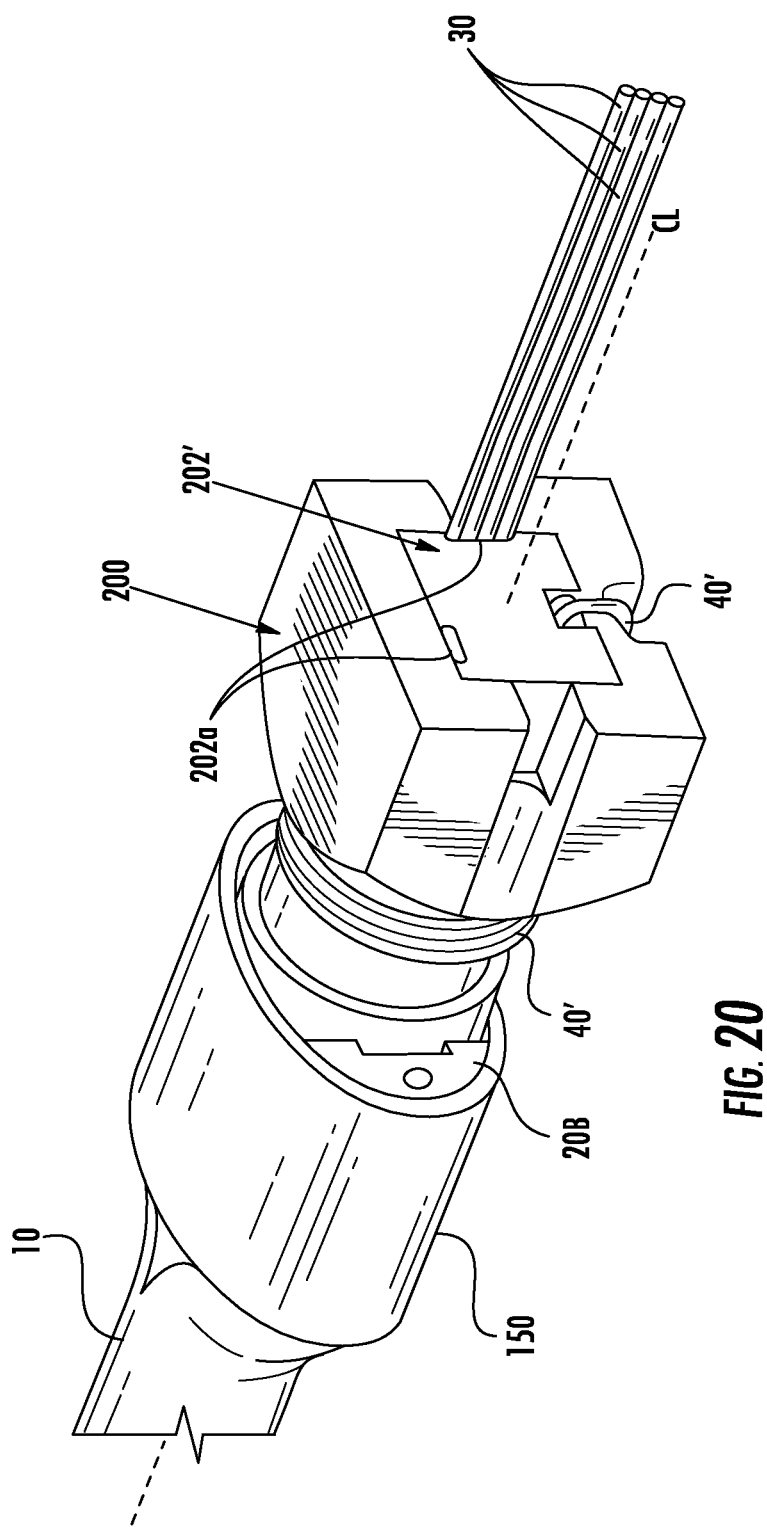
FIG. 20 is a perspective view of another cable attach structure having an insert with multiple pathways or guide slots for routing the optical fiber to different positions.

FIG. 20 is a perspective view of still another cable attach structure 200 having an insert 202' with multiple pathways or guide slots for routing the optical fiber to different positions similar to the other embodiments. Insert 202' and/or body has a plurality of guide slots (i.e., pathways) formed by notches to allow different routing configurations for routing optical fibers off-axis from the centerline CL of the cable attach structure and/or cable. In the example shown, the cable attach structure 200 and insert 202' routes the optical fiber to the right-side (i.e., east direction) of the centerline CL instead of the top or bottom for protecting and/or routing the optical fiber to the connector. Thus, embodiments can have inserts with several guide slots for allowing flexibility for multiple different configurations as desired.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

We claim:

1. A fiber optic cable assembly, comprising:
   a fiber optic cable comprising at least one optical fiber;
   a connector attached to an end of the at least one optical fiber;
   a cable attach structure comprising a front end, a rear end, and a longitudinal centerline, the front end having a slot at the centerline, the cable attach structure routing the end of the at least one optical fiber inserted in the rear end of the cable attach structure such that the end of the at least one optical fiber extends out of the front end of the cable attach structure away from the longitudinal centerline of the cable attach structure and the slot;
   a circuit board secured to the cable attach structure within the slot; and
   an active component positioned on the circuit board.

2. The fiber optic cable assembly of claim 1, wherein the cable attach structure includes an insert.

3. The fiber optic cable assembly of claim 1, wherein the cable attach structure includes one or more clearance grooves.

4. The fiber optic cable assembly of claim 1, wherein the cable attach structure comprises one or more pins for securing the circuit board within the slot.

5. The fiber optic cable assembly of claim 1, wherein the optical fiber enters the connector from a first direction and attaches to the connector in a second direction opposite from the first side of the circuit board.

6. The fiber optic cable assembly of claim 1, wherein the at least one optical fiber enters the connector on a first side of the circuit board and attaches to the connector on a second side of the circuit board opposite from the first side of the circuit board.

7. The fiber optic cable assembly of claim 6, wherein the circuit board has a notch for making a transition from a first direction to a second direction.

8. The fiber optic cable assembly of claim 1, wherein the connector includes at least one lens.

9. The fiber optic cable assembly of claim 1, the fiber optic cable further including a first strength member, and a second strength member, wherein the first strength member and the second strength member are disposed on opposite sides of the at least one optical fiber, and the cable attach structure having a first protrusion and a second protrusion, wherein the first protrusion and the second protrusion are disposed on opposite sides of the at least one cable attach structure, and the first strength member is secured to the first protrusion and the second strength member is secured to the second protrusion.

10. The fiber optic cable assembly of claim 1, further including a crimp band for securing one or more strength members of the fiber optic cable.

11. The fiber optic cable assembly of claim 1, wherein the rear end comprises a barrel.

12. The fiber optic cable assembly of claim 11, wherein the fiber optic cable is attached to the barrel using a crimp band.

13. The fiber optic cable assembly of claim 1, wherein the cable attach structure comprises a fiber channel that extends from a first opening at the rear end to a second opening at the front end.

14. The fiber optic cable assembly of claim 1, further comprising a connector nose piece attached to the circuit board.

15. The fiber optic cable assembly of claim 1, further comprising a multi-piece shell.

16. The fiber optic cable assembly of claim 1, wherein the circuit board is capable of performing optical-to-electrical (O-E) or electrical-to-optical (E-O) signal conversions.

17. The fiber optic cable assembly of claim 1, wherein the cable attach structure comprises passages that are disposed at a front end and extend through toward the medial portion of the cable attach structure.

18. A cable attach structure, comprising:
   a body comprising:
      a front end and a rear end;
      a fiber channel extending between a first opening at the front end and a second opening at the rear end, wherein the fiber channel is tapered such that the fiber channel at the first opening is smaller than the fiber channel at the second opening, and such that the fiber channel at the first opening is located off a longitudinal centerline axis of the cable attach structure; and
      a slot at the front end for receiving a circuit board, wherein the first opening is located on one side of the slot.

19. The fiber optic cable assembly of claim 18, wherein the cable attach structure comprises a body with a rear end having the fiber optic cable attached to the rear end, and a front end with a portion of the circuit board attached to the slot, thereby forming a fiber optic cable assembly.

20. A method of making a fiber optic cable assembly, comprising the steps of:
   providing a fiber optic cable comprising at least one optical fiber;
   providing a cable attach structure comprising:
      a front end, a rear end, and a longitudinal centerline;
      a slot along the longitudinal centerline of the cable attach structure at the front end; and
      a fiber channel extending between the front end and the rear end for routing the at least one optical fiber away from the longitudinal centerline of the cable attach structure and the slot;
   attaching the fiber optic cable to the rear end of the cable attach structure;
   providing a circuit board and securing the circuit board within the slot at the front end of the cable attach structure; and
   coupling the fiber optic cable to a first side of the circuit board.

* * * * *